United States Patent [19]
Dyer

[11] Patent Number: 5,622,921
[45] Date of Patent: Apr. 22, 1997

[54] ANIONIC COMPOSITIONS FOR SLUDGE PREVENTION AND CONTROL DURING ACID STIMULATION OF HYDROCARBON WELLS

[75] Inventor: Richard J. Dyer, Midland, Tex.

[73] Assignee: Nowsco Well Service, Inc., Houston, Tex.

[21] Appl. No.: 6,602

[22] Filed: Jan. 21, 1993

[51] Int. Cl.$^6$ .................................................. C09K 7/00
[52] U.S. Cl. ........................ 507/259; 507/261; 507/266; 507/923; 507/930; 507/933; 507/934
[58] Field of Search .................................. 507/933, 934, 507/259, 266, 261, 923, 930

[56] References Cited

U.S. PATENT DOCUMENTS

| | | |
|---|---|---|
| 3,076,760 | 2/1963 | Markham . |
| 3,083,158 | 3/1963 | Markham . |
| 3,681,240 | 8/1972 | Fast et al. . |
| 4,073,344 | 2/1978 | Hall . |
| 4,442,014 | 4/1984 | Looney et al. . |
| 4,663,059 | 5/1987 | Ford . |
| 4,698,168 | 10/1987 | Briggs . |
| 4,823,874 | 4/1989 | Ford . |
| 5,034,140 | 7/1991 | Gardner et al. . |

OTHER PUBLICATIONS

Delorey, J.R. and R.S. Taylor, "Recent Studies Into Iron/Surfactant/Sludge Interactions in Acidizing", Petroleum Society of CIM, 1986.

Delorey, John and Robert Taylor, "Iron/Surfactant/Crude Interactions—New Considerations in Acidizing", 3rd Brazilian Petroleum Congress, 1986.

*Primary Examiner*—Richard D. Lovering
*Attorney, Agent, or Firm*—Sue Z. Shaper; Butler & Binion, L.L.P.

[57] ABSTRACT

This invention relates to anionic compositions, containing an alkyl aryl sulfonic acid or salt thereof, a nonethoxylated glycol and an acetylenic alcohol in an alkyl alcohol solvent, that have proved effective for controlling sludge and emulsion formation during acid stimulation and treatment of hydrocarbon wells.

28 Claims, No Drawings

ANIONIC COMPOSITIONS FOR SLUDGE PREVENTION AND CONTROL DURING ACID STIMULATION OF HYDROCARBON WELLS

FIELD OF THE INVENTION

The invention relates to compositions and methods for preventing and controlling sludge and/or emulsion formation during acidizing treatment of crude hydrocarbon wells, and more particularly, an improved sludge inhibiting composition and method for treatment of hydrocarbon crudes where the acidizing fluids contain especially high iron concentrations.

BACKGROUND OF THE INVENTION

A common practice to increase production from a crude oil or gas well involves an acid stimulation treatment of the well. Acid stimulation of a well involves the pumping downhole of an aqueous acid solution which reacts with the subterranean hydrocarbon containing formations, such formations usually consisting of limestone or sand, to increase the size of the pores within the formations and provide enlarged passageways for the crude hydrocarbons to more freely move to collection points which otherwise would be obstructed. Unfortunately, during such acidizing operations asphaltene containing asphaltic sludge precipitates, blocking the existing and newly formed passageways and reducing the efficacy of the acidizing treatment. The formed asphaltic sludges vary in appearance depending on the types of additives used, amount of iron present, and the nature of the crude. In addition, crude hydrocarbons contain chemicals which stabilize emulsions formed upon contact with the aqueous acid during an acid stimulation treatment. Such emulsions are undesirable because they increase the viscosity of the pumped fluid and impede the flow into and out from the well bore.

Various additives may be included in the acidizing solution to minimize such sludging and emulsification of the hydrocarbon/acid solution. While known anti-sludging compositions are effective for some types of crude hydrocarbons and pumping conditions, they do not consistently perform well with the wide variety of such crudes and conditions encountered in the field, and are especially ineffective where the acidizing fluids include significant concentrations of iron containing ferrous ($Fe^{+2}$) and/or ferric ($Fe^{+3}$) salts. The most troublesome iron concentrations are the especially high iron concentrations which include iron concentrations of over about 2,000 parts per million (ppm), based on the weight of acidizing fluid, and may reach 35,000 parts per million and even higher.

More specifically, during the acidizing process of stimulating a subterranean hydrocarbon containing formation, contaminants, treating fluids and formation hydrocarbon fluids can interact to form undesirable precipitate sludges. It is well known that strong acids such as hydrochloric, hydrofluoric or hydrochloric/hydrofluoric blends cause sludging upon contact with certain crude oils, particularly crude oils from wells in California, Alaska, Canada, Texas, Oklahoma and Louisiana, among others. The use of strong acids pose more of a sludging problem than weak acids, such as acetic or formic acids; yet, the strong acids are preferred for their superior ability to react with and enlarge passageways in the subterranean formations.

It has been observed that the amounts and types of asphaltenes present in the crude hydrocarbons play a major role in sludge formation. Asphaltenes may be present in crude hydrocarbons in the form of a colloidal dispersion which consists of an aggregate of polyaromatic molecules surrounded and stabilized by lower molecular weight neutral resins and paraffinic hydrocarbons. Strong acids from the stimulating treatment seem to destabilize the asphaltic colloidal dispersion and thus cause asphaltenic sludge precipitates and rigid film emulsions. This strong acid/crude oil interaction can be readily observed by placing a drop of oil on top of or surrounding a drop of acid on a glass slide. A rigid film becomes readily apparent in only a few minutes. Under a microscope, small droplets of acid develop very black irregularly shaped rings around them indicative of the sludging and emulsion-forming processes.

Sludging tendencies of different hydrocarbon crudes vary with structural variations in the stabilizing resin layer or are even based on the length of time a well or field has been producing. Additives which tend to remove the colloidal dispersion stabilizing resins seem to affect the quantity of asphaltene sludge produced. Also, many nonemulsifiers or demulsifiers, as well as surface tension reducing agents, have oil soluble detergent components which serve to destabilize the asphaltene containing colloidal dispersion and increase acid related asphaltenic sludge formation.

The amount of iron contamination in the acidizing fluids is also important in the formation of undesirable sludge. Hydrocarbon crudes, especially those with high asphaltene colloidal stabilizing resin to asphaltene ratios, are known to form insoluble sludge in the presence of acid solutions. In addition, acid solutions with iron concentrations such as 2000 ppm and above are known to form insuluble sludges considerably worse. The iron originates from several sources, including contamination in the technical acid solution itself, leaching from the iron-containing piping and surface pumps used in the process of pumping downhole the acid-containing fluid, as well as from the subterranean rock and mineral formations. The amount of iron present in the acidizing fluid in the well can easily exceed 5,000 ppm and even reach 35,000 ppm and higher. The amount of iron is present in many wells as both ferrous ($Fe^{+2}$) and ferric ($Fe^{+3}$) ions, in approximately a 3:1 ratio. Ferric ($Fe^{+3}$) ions increase the sludging tendencies to a considerably greater extent than ferrous ($Fe^{+2}$) ions.

Many chemical compounds and compositions exist which are classified as anti-sludgers, nonemulsifiers or demulsifiers, mutual solvents, iron controllers or corrosion inhibitors and are said to affect sludge formation during well acidizing. For example, Hall U.S. Pat. No. 4,073,344 discloses a method of treating subterranean formations with a composition for reducing the adsorption of treatment additives on the formations. The composition includes ethoxy ethanols in addition to corrosion inhibitors, such as propargyl alcohol, anti-sludge agents such as dodecyl benzenesulfonate (DDBSA), acids, demulsifiers and surfactants. Esters of dodecyl benzenesulfonic acid are disclosed in Looney et al U.S. Pat. No. 4,442,014 as anti-sludging agents which require surfactants such as alkoxylated polyfunctional alcohols, alkoxylated polyols, or alkoxylated alkylphenol-formaldehyde resins. An ethoxylated alkylphenol dissolved in ethylene glycol and methanol is described as a dispersant for an anti-sludging sulfonic acid in Ford U.S. Pat. No. 4,823,874.

Conventional acid treatment systems to enhance oil production have relied mainly on cationic corrosion inhibitors consisting of quaternized amines, and combinations including such quaternized amines along with oxyalkylated alkylphenols, complex polyesters, formaldehyde and acetylenic alcohols in aromatic hydrocarbons, alcohols or water. Briggs U.S. Pat. No. 4,698,168 discloses a corrosion inhibiting composition containing an acetylenic alcohol, propargyl alcohol, and 2-ethoxy ethanol with minor amounts of a polyethylene glycol, an alkylphenol-formaldehyde resin, quinoliniums and tar bases.

Conventional nonemulsifiers include cationic organic amines or quaternized amines, as well as ethoxylated alkylphenols. Many acidizing systems which incorporate polymeric nonionic additives and cationic additives still tend to form emulsions due to the absorption of the additives onto fine mineral particles which are released from the earth formations during the acidizing treatments.

While such currently used techniques and acidizing mixtures have achieved varying degrees of success, especially where the asphaltene content of the crude is below about 0.5% by weight and the iron content is below about 2000 ppm, the current treatments have failed to produce consistently the necessary anti-sludging properties, especially at higher levels of iron. It is, therefore, a purpose of the present invention to provide new and useful compositions for including in a method of acid stimulation of hydrocarbon wells. Such compositions inhibit or prevent the formation of asphaltene sludges in the presence of treating acids with relatively high concentrations of ferric and ferrous ions.

SUMMARY OF THE INVENTION

In accordance with the present invention, an anionic composition has been proved effective for controlling sludge and emulsion formation during acid stimulation and treatment of hydrocarbon wells, specifically where the crude hydrocarbon contains sufficient amounts of asphaltene and/or the acidizing fluid contains iron ions, such as ferric ($Fe^{+3}$) and ferrous ($Fe^{+2}$) ions, in concentrations over about 2000 ppm. Specifically, the anionic anti-sludge composition of the present invention includes a mixture of an anionic alkyl aryl sulfonic acid or sulfonate combined with nonethoxylated glycols and acetylenic alcohols in an alkyl alcohol solvent.

("Nonethoxylated glycol", as understood and used herein by the inventor, does not include ethylene glycol or a substance reacted with ethylene oxide.)

Another aspect of the present invention provides a method of increasing oil production in hydrocarbon wells by the addition of an acid solution containing the herein described anti-sludge compositions.

In another aspect of the present invention, the compositions of the present invention, when combined with the acid treating fluid, also serve to prevent the formation of emulsions or to demulsify crude hydrocarbon mixtures.

DESCRIPTION OF THE PREFERRED EMBODIMENTS

The present invention provides anionic compositions which have been shown to be dramatically effective in inhibiting or preventing sludge and emulsion formation during acidizing treatment of well formulations containing crude hydrocarbon fluids, especially where the acidizing fluids contain or acquire iron concentrations sufficient to cause sludges and/or the crude hydrocarbons contain a sufficient amount of asphaltene to form sludges and/or emulsions. However, since the majority of the iron contamination develops after the acidizing fluids are pumped out of a storage tank, there is no reliable manner of predetermining the amount of iron that is present in the well. If one does not include an anti-sludging composition during the acidizing process capable of operating under the full range of conditions possible downhole, a sludge may subsequently form; and although knowledge is gained at that well for future treatments, it may be too late to adjust the current treatment, since the sludge once formed is difficult to remove. One can analyze how a specific crude will behave in the presence of acid and different amounts of iron to determine possible sludging scenarios. Alternatively, one can assume that there will be iron contamination and asphaltene content sufficient to form sludges and/or emulsions and include the present anti-sludging compositions that perform best under such conditions The present compositions include a mixture comprised of at least one anionic alkyl aryl sulfonic acid or sulfonate such as 4-alkylphenyl sulfonic acid where the alkyl group includes $C_8$–$C_{18}$, in combination with at least one nonethoxylated glycol solvating agent and at least one acetylenic alcohol, such as propargyl alcohol in an alcohol solvent, such as a $C_1$–$C_5$ monohydric alcohol.

The anti-sludge compositions of the present invention are importantly of anionic character, and specifically contain no cationic components which adversely affect the anti-sludging effect. These specific anionic mixtures, particularly including the superior solvating characteristics associated with the straight chain glycols and polyglycols having the general formula of $R[OC_nH_{2n}]_xOR$, where R is hydrogen, methyl or ethyl, n has a value from 3 to 8, and x has a value from 1 to 100, demulsify quicker and prevent sludge formation more reliably, where the acidizing fluid is contaminated with sludge inducing iron concentrations, than the currently available anti-sludge compositions.

The anionic compositions include anionic alkyl aryl sulfonic acids or sulfonates; and dodecyl benzenesulfonic acid (DDBSA) is the most preferred sulfonate for the present compositions. Other anionic alkyl aryl sulfonates can be used in this invention, for example, where the anionic alkyl aryl sulfonic acid has an alkyl group having about 8 to 18 carbon atoms. Such alkyl aryl sulfonic acids are anionic in character and have a free negative charge in aqueous solutions. Mixtures of such anionic surfactants can also be incorporated in the present compositions. The alkyl long chain portion of the anionic dodecyl benzenesulfonic acid is believed to solublize the ionic and polar contaminants that can react with the sulfonic acid. Thus, the anionic dodecyl benzenesulfonic acid acts as a surfactant which helps to stabilize and keep the crude hydrocarbon stream free from sludge forming particulates by preventing the polar impurities from catalyzing polymerization of the colloidally dispersed asphaltene component of the hydrocarbon stream. The anionic dodecyl benzenesulfonic acid is included in the anti-sludge composition in the range between about 30 percent by volume and about 50 percent by volume of the total volume of the composition, and preferably between about 35 percent by volume and about 45 percent by volume of the final demulsifying anti-sludge compositions.

Solvating agents consist of nonethoxylated glycols including water soluble compounds of the general formula of:

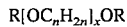

$$R[OC_nH_{2n}]_xOR$$

where n has a value of 3 to 8, x has a value of 1 to 100, and R is hydrogen, methyl or ethyl. Such compounds include propylene glycol, dipropylene glycol, tripropylene glycol, polypropylene glycols and mono and dialkyl ethers of such glycols. Mixtures of the present invention containing such nonethoxylated glycols have been found to better inhibit or prevent asphaltenic sludge formation where crude hydrocarbons are acidized with acid solutions having iron contamination such as concentrations greater than about 2,000 ppm than those containing ethylene glycol, polyethylene glycols and alkyl ethers of ethylene glycol, and the like. Such solvating agents of the present invention are soluble in both aqueous and nonaqueous olefinic solutions. The nonethoxylated glycols or a mixture of such glycols in this invention are included in the range of about 30 percent to approximately 50 percent by volume of the anti-sludge composition. More preferably, the concentration of glycol solvent falls within the range of approximately 35 percent by volume to about 40 percent by volume.

The anionic acetylenic alcohols are included in the formulation of this invention, not for their known corrosion prevention properties, but as a novel complementary means of preventing sludge formation by controlling the effect of iron contamination during the acidizing treatment. Such acetylenic alcohols, including SURFYNOL brand acetylenic diol wetting agents from Air Products and Chemicals, Inc., Allentown, Pa., butynol, octynol, pentynol, hexynol and mixtures of such soluble alkynols can be used. Specifically, propargyl alcohol has been found to be very effective. In the present invention, propargyl alcohol is included in the range of about 5 percent to about 20 percent by volume of the finished anti-sludge composition. Preferably, propargyl alcohol is included in the range between about 7.5 percent by volume and about 12.5 percent by volume of the present compositions.

Alkyl alcohols used as co-solvents for the present anti-sludging compositions can include methanol, ethanol, isopropanol, butanol, and other such monohydric alcohols. The amount of alkyl alcohol co-solvent is in the range of about 5 percent to about 25 percent by volume and more preferably between about 10 percent and about 20 percent by volume of the present compositions. Besides the alcohol's ability to act as a solvent, it is also a pour point modifier, as it reduces the viscosity of the composition and the treated hydrocarbons.

The optimal concentrations of the present anti-sludging compositions include about 39 percent by volume of the anti-sludging compositions alkyl aryl sulfonic acid, about 37 percent by volume nonethoxylated glycol solvating agent, about 14 percent by volume alkyl alcohol and about 10 percent by volume acetylenic alcohol.

Prior to the time when the acidizing fluid is pumped downhole, the anti-sludge compositions of the present invention may be combined with an acid containing aqueous solution and any other desired additives. The acids routinely used for the acidizing treatment of hydrocarbon fields include hydrochloric acid, hydrofluoric acid, acetic acid, sulfamic acid, formic acid and blends of the above acids. The acidizing fluids that are pumped downhole normally contain acid between about 10% by weight and about 28% by weight, and preferably about 15 percent by weight in an aqueous solution. The anti-sludging anionic compositions of the present invention are added to the acid containing solution in an amount between about 0.5 percent by volume and about 6 percent by volume of the final acidizing fluid, and preferably between about 2 percent and about 4 percent by volume.

The present compositions can be used in the acidizing treatments with other additives, such as iron control agents and reducers, such as citric acid, ethylenediaminetetraacetic acid, acetic acid, nitrilotriacetic acid, and sodium erythorbate, among others. The compositions of the present invention are also compatible with most nonionic and anionic foamers, retarders and viscosifiers. The compositions of the present invention are stable and can be produced and stored for some time before use in a well. Acidizing solutions containing the present compositions are also quite stable and the anti-sludge composition remains dispersed therein. No additional components, such as dispersing surfactants, are normally required to maintain the compositions' ingredients in proper solution form. The present anionic compositions also are not generally adsorbed by subterranean siliceous and carbonaceous formations.

The method generally used for increasing the production of crude hydrocarbons involves pumping downhole an acid fluid containing an acid, such as hydrochloric acid, wherein the acid comprises between about 10 percent to 28 percent by weight of the acidizing fluid and preferably about 15 percent by weight of the acid fluid, iron control agents, such as acetic acid and citric acid, such agent at about 0.1 percent by volume to about 1.5 percent by volume of the acidizing fluid, and preferably each agent at about 0.5 percent by volume, and the anionic anti-sludging compositions described herein. The anionic anti-sludge compositions of this invention are added to and mixed with the acid solution at the various well sites in an amount ranging from about 0.5 percent to about 6 percent by volume of the acidizing fluid, and preferably between about 2 percent and 4 percent by volume. The fluid is pumped downhole under pressures generally not exceeding about 10,000 psi, is allowed to penetrate the subterranean formations at temperatures ranging from 50°–200° F. normally over not more than twenty four hours, after which the spent acid solution is pumped back up the hole, followed by resumed oil production. An alternative method of increasing the crude hydrocarbon production includes a preflush of an acid solution that can be performed to help cool the well, if cooling is required. However, a single administration of the acidizing solution with an anionic anti-sludge composition of the present invention is normally sufficient.

Table 1 contains the results of tests that show the importance of including acetylenic alcohols in the present anionic anti-sludge compositions, especially when acid treating formations containing crude hydrocarbons with acidic fluids contaminated with ionic iron. The tests were performed by preparing fifty milliliters (ml) of an aqueous solution containing 15 weight percent hydrochloric acid, 0.5 percent by volume acetic acid, 0.5 percent by volume citric acid, 10,000 ppm of iron in a 3:1 ferrous/ferric ion ratio and the various additives which comprise the present compositions in the concentrations indicated in Table 1 at the percentages listed as a percent of the acidizing fluid volume. Fifty milliliters of a crude oil sample were added to the acid fluid and the resulting mixture was agitated vigorously for thirty seconds, then placed in a 100° F. water bath. After thirty minutes, the oil and acid mixture was removed from the water bath and poured through a 100 mesh wire screen. The presence or absence on the screen of any trapped sludge formed during the incubation was visually monitored.

TABLE 1

10,000 ppm iron; 15 weight % hydrochloric acid based on the acid solution weight; composition percentages based on blend volume

| FIELD | BLEND | COMPOSITION | RESULTS |
| --- | --- | --- | --- |
| Clearfork | #1 | 1% DDBSA<br>1% Dipropylene glycol<br>0.5% Methanol | Sludge |
|  | #2 | 1% DDBSA<br>1% Dipropylene glycol<br>0.5% Methanol<br>0.3% Propargyl alcohol | No Sludge |
|  | #3 | 1% DDBSA<br>1% Dipropylene glycol<br>0.5% Methanol<br>0.3% OW-1 Blend* | No Sludge |
|  | #4 | 1% DDBSA<br>1% Dipropylene glycol<br>0.5% Methanol<br>0.3% Ethyloctynol | Sludge |

*OW-1 is a commercial blend of acetylenic diols.

The results of these tests indicate that acetylenic alcohols soluble in the final acidizing fluid provide the maximum sludge prevention activity in the present anti-sludge compositions. Blend #1, containing dodecyl benzenesulfonic acid with dipropylene glycol alone failed to prevent sludge formation. The addition of propargyl alcohol (Blend #2) or a commercial mix of acetylenic alcohols (Blend #3), marketed as SURFYNOL OW-1 from Air Products and Chemicals, Inc., Allentown, Pa. was successful in inhibiting the formation of asphaltic sludge. Ethyloctynol (Blend #4) was less soluble in the solvent system than propargyl alcohol and was less effective in preventing an asphaltene sludge as well.

Table 2 includes the results of tests, performed as above, which indicate that anti-sludge compositions of the present invention which contain glycolic solvents with the general formula $R[OC_nH_{2n}]_xOR$, where n is in the range of 3 to 8, x has a value of 1 to 100, and R is hydrogen, methyl or ethyl, successfully hindered formation of asphaltenic sludges when crude hydrocarbons were acid treated with acid solutions containing iron contamination sufficient to form such sludges.

TABLE 2

10,000 ppm iron; 15% weight hydrochloric acid solution; composition percentages based on blend volume

| FIELD | BLEND | COMPOSITION | RESULTS |
| --- | --- | --- | --- |
| Clearfork | #5 | 1% DDBSA<br>0.3% Propargyl alcohol<br>0.5% Methanol<br>1% Dipropylene glycol | No Sludge |
|  | #6 | 1% DDBSA<br>0.3% Propargyl alcohol<br>0.5% Methanol<br>1% Tripropylene glycol | No Sludge |
|  | #7 | 1% DDBSA<br>0.3% Propargyl alcohol<br>0.5% Methanol<br>1% Polypropylene glycol* | No Sludge |
| San Andres | #8 | 1% DDBSA<br>0.3% Propargyl alcohol<br>0.5% Methanol<br>1% Dipropylene glycol | No Sludge |
|  | #9 | 1% DDBSA<br>0.3% Propargyl alcohol<br>0.5% Methanol<br>1% Tripropylene glycol | No Sludge |

*Polypropylene glycol had a molecular weight of about 3400.

These test results indicate that the presence of glycol solvating agents of the general formula $R[OC_nH_{2n}]_xOR$, where n is in the range of 3 to 8, x has a value of 1 to 100, and R is hydrogen, methyl or ethyl, in the anti-sludging compositions of the present invention provides superior sludge prevention. In compositions of the present invention including dodecyl benzenesulfonic acids and acetylenic alcohols, the anti-sludge preventing capabilities of several nonethoxylated glycol solvating agents were approximately similar. Blend #5 containing 1% volume dipropylene glycol, where n=3, x=2 and R is hydrogen, in combination with 1% by volume dodecyl benzenesulfonic acid and 0.3% by volume propargyl alcohol, prevented the formation of asphaltenic sludges. Similarly, tripropylene glycol (Blend #6) and polypropylene glycol (Blend #7), also of the same general formula, prevented the formation of asphaltenic sludges upon acid contact with hydrocarbon crudes containing concentrations of iron ions. This result was confirmed with two different crudes with different asphaltene concentrations, San Andres (asphaltene—0.5%, paraffin—3.0%) and Clearfork (asphaltene—2.2%; paraffin—3.7%).

The use of anionic anti-sludge compositions of the present invention in actual acidizing treatment of poorly producing wells has been dramatically effective in increasing production from the wells. The anionic anti-sludge composition of the present invention included optimal concentrations of about 39 percent by volume dodecyl benzenesulfonic acid, about 37 percent by volume nonethoxylated glycol solvating agent, about 14 percent by volume methanol and about 10 percent by volume propargyl alcohol. The anionic anti-sludge composition was added to and mixed with a 15 percent by weight hydrochloric acid aqueous solution with 0.5 percent by volume acetic acid and 0.5 percent by volume citric acid, in the amounts and at the various well sites listed in Table 3. The fluid was pumped downhole, allowed to penetrate the subterranean formations over a little less than twenty four hours, and the spent acid solution was pumped back up. Resumed oil production then followed and the change in the well production in barrels per day and percentage increase are summarized in Table 3.

TABLE 3

Acidizing composition comprised of 39% DDBSA, 37% dipropylene glycol, 10% propargyl alcohol and 14% methanol, acidizing fluid contained 15% by weight hydrochloric acid.

| BLEND | FIELD | ACID VOLUME gallons | ANTI-SLUDGE COMPOSITION | PRODUCTION INCREASE barrels/day | [percent] |
|---|---|---|---|---|---|
| #10 | Clearfork | 3000 | 75 gallons | 10 → 28 | [180%] |
| #11 | San Andres | 1500 | 40 gallons | 12 → 30 | [150%] |
| #12 | Greyburg | 2000 | 30 gallons | 5 → 31 | [520%] |
| #13 | Clearfork #2 | 3000 | 22.5 gallons | 25 → 35 | [40%] |
| #14 | Paluxy | 2000 | 80 gallons | 3 → 96 | [3100%] |

NONEMULSIFYING AND DEMULSIFYING PROPERTIES

The compositions of the present invention also have beneficial nonemulsifying or demulsifying properties, as well as the anti-sludging activity. When aqueous acids contact crude hydrocarbons or oils in the formations, an emulsion can form which greatly increases the viscosity of the pumped hydrocarbon/acid solution, thereby increasing the difficulty of extracting the solution out of the well. An aqueous acidizing fluid which produces little or no emulsion is beneficial even after the acidized hydrocarbon is pumped from the formation. Specifically, an aqueous acidizing fluid which cleanly separates from the crude hydrocarbons allows a simpler method of recovery of the spent acid solution from the crude hydrocarbon.

Table 4 contains the results of the tests that indicate the anti-sludge compositions of the present invention have complementary nonemulsifying properties. The tests were performed by preparing fifty milliliters (ml) of a solution containing 15 weight percent hydrochloric acid, 0.5 percent by volume acetic acid, 0.5 percent by volume citric acid, the amount of iron as indicated in Table 4 in a 3:1 ferrous/ferric ratio and the various additives which comprise the present compositions in the concentrations indicated in Table 4 at the percentages listed as a percent of the acidizing fluid volume. Fifty milliliters of a crude oil sample were added to the acid fluid and the two solutions were agitated vigorously for thirty seconds, then placed in a 100° F. water bath. The aqueous acid/hydrocarbon separation was observed for thirty minutes to detect the presence of an emulsion or the time required for the emulsion to break.

TABLE 4

15% by weight hydrochloric acid; composition percentages based on total volume of the acidizing fluid

| FIELD | BLEND | COMPOSITION | IRON ppm | EMUL-SION |
|---|---|---|---|---|
| Clearfork | #15 | 1% DDBSA<br>0.5% Methanol<br>1% Dipropylene glycol | 10000 | NONE |
|  | #16 | 1% DDBSA<br>0.5% Methanol<br>1% Dipropylene glycol<br>.3% Propargyl alcohol | 10000 | NONE |
|  | #17 | 1% DDBSA<br>0.5% Methanol<br>1% Dipropylene glycol<br>0.3% OW-1 Blend+ | 10000 | PRESENT |
|  | #18 | 1% DDBSA<br>0.5% Methanol<br>1% Dipropylene glycol<br>0.3% Ethyloctynol | 10000 | PRESENT |
|  | #19 | 1% DDBSA<br>0.5% Methanol<br>0.3% Propargyl alcohol<br>1% Tripropylene glycol | 10000 | NONE |
|  | #20 | 1% DDBSA<br>0.5% Methanol<br>0.3% Propargyl alcohol<br>1% Polypropylene glycol* | 10000 | PRESENT |
| San Andres | #21 | 1% DDBSA<br>0.5% Methanol<br>1% Propylene glycol | 5000 | NONE |
|  | #22 | 1% DDBSA<br>0.5% Methanol<br>0.5% Propargyl alcohol<br>1% Dipropylene glycol | 5000 | NONE |
|  | #23 | 1% Oxyalkylated fatty amine<br>1% Nonionic aryl sulfonate | 5000 | PRESENT |
|  | #24 | 2% Ethylene glycol monobutyl ether<br>2% Nonionic aryl sulfonate | 5000 | PRESENT |

+OW-1 is a commercial blend of acetylenic diols.
*Polypropylene glycol had a molecular weight of about 3400.

The anti-sludge compositions of the present invention clearly have nonemulsifying capabilities, as shown by the data in Table 4. The propargyl alcohol (Blend #16) and OW-1 acetylenic diol blend (Blend #17) performed better than the ethyloctynol (Blend #18), similar to their behavior in the anti-sludging analysis (Table 1). However, the lower molecular weight glycols, propylene glycol (Blend #21), dipropylene glycol (Blends #15 and #16) and tripropylene glycol (Blend #19) had superior nonemulsifying capabilities as compared to the polypropylene glycol (Blend #20). There was little difference between the nonemulsifying capabilities at these composition concentrations at iron concentrations of 5000 ppm or 10000 ppm (Blends #16 and #22). None of the other commonly used additives (Blends #23 and #24) displayed as dramatic nonemulsifying activity.

The anionic compositions of the present invention act as a demulsifier as well as a nonemulsifier, breaking up any emulsions that may have formed in the acidized hydrocarbon solution. After combining withdrawn hydrocarbon solutions, one with the present composition and another containing an emulsion, the presence of the present anionic demulsifying anti-sludge composition helped demulsify the combined solution.

This invention provides a single composition which performs several important complementary functions, thereby increasing the production of crude hydrocarbons through acidizing the subterranean formations with acid solutions containing iron concentrations sufficient to form sludges, such as over about 2,000 ppm. Although the present invention dramatically supresses the formation of asphaltic sludges during acid stimulation of crude hydrocarbon wells when the aqueous acidizing fluids contain over about 5,000 ppm of iron, the present inventive compositions also prevent sludges when the iron content is 5,000 ppm and below. Acidizing treatments are quite often performed in remote locations under less than desirable conditions. In addition, many currently available demulsifying agents decrease the capability of anti-sludge additives when combined together. So a single composition which has both complementary activities would allow safer and more reproducible results.

The invention will be further understood by reference to the following examples which illustrate the preferred forms of the invention.

EXAMPLE 1

An anionic composition useful for suppressing the formation of sludge and/or emulsion when a geological formation is acidized with acid solutions containing iron contamination sufficient to form sludge in order to stimulate the flow of crude oil was prepared from the following components:

| Dodecyl benzenesulfonic acid | 39% |
| Dipropylene glycol | 37% |
| Methanol | 14% |
| Propargyl alcohol | 10% |

A one liter amount of the anionic anti-sludge composition of the present invention was prepared by the following manner. Methanol (140 ml), dipropylene glycol (370 ml) and propargyl alcohol (100 ml) were combined in a one liter beaker. An amount of dodecyl benzenesulfonic acid (390 ml) was added to the beaker and the solution was manually stirred until clear, about 30 seconds.

The solution formed in Example 1 remained clear, indicating continual miscibility upon storage. An acidizing test fluid was formed when one ml of Example 1 was added to fifty ml of 15 weight percent aqueous hydrochloric acid and 0.5 percent by volume acetic acid and 0.5 percent by volume citric acid and 10,000 ppm of iron in a 3:1 ferrous to ferric mix. The acidizing test fluid was added to fifty ml of San Andres crude and the resulting mixture was agitated for thirty seconds and placed in a water bath set at 100° F. After thirty minutes, no emulsion was apparent and no sludge was observed when the mixture was poured through a 100 mesh wire screen. Therefore, the process of Example 1 dramatically prevented the formation of emulsions and asphaltenic sludges in test analysis under acidizing conditions.

EXAMPLE 2

An acidizing fluid useful for suppressing the formation of sludge and/or emulsion when a geological formation is acidized under conditions which generate iron contamination sufficient to form such sludge and/or emulsion in order to stimulate the flow of crude oil was prepared from the following components:

| Anti-sludge composition | 2% volume |
|---|---|
| Dodecyl benzenesulfonic acid 0.8% | |
| Dipropylene glycol 0.7% | |
| Methanol 0.3% | |
| Propargyl alcohol 0.2% | |
| Citric acid | 0.5% volume |
| Acetic acid | 0.5% volume |
| 15 weight % Hydrochloric acid | 97% volume |

The use of the anionic anti-sludge composition of the present invention in actual acidizing treatment of poorly producing wells has been dramatically effective in increasing production from the wells. The anionic anti-sludge composition of the present example included optimal concentrations of 39 percent by volume dodecyl benzenesulfonic acid, 37 percent by volume dipropylene glycol solvating agent, 14 percent by volume methanol and 10 percent by volume propargyl alcohol. Forty gallons of the anionic anti-sludge composition was added to a tank containing two thousand gallons of a solution containing a 15 percent by weight hydrochloric acid, 0.5 percent by volume acetic acid and 0.5 percent by volume citric acid. The acid solution and anti-sludge composition were mixed by circulating with a pump and by aerating with an air stream through a submerged nozzle. This acidizing solution was maintained in a thoroughly mixed state for the remaining trial. The fluid was pumped downhole under about 2000 psi of pressure, allowed to penetrate the subterranean formations over the course of about five hours, then the spent acid solution was pumped back up. Resumed oil production then followed and the change in the well production in barrels per day and percentage increase was measured.

| FIELD | ACID VOLUME gallons | ANTI-SLUDGE COMPOSITION | PRODUCTION INCREASE | |
|---|---|---|---|---|
| | | | barrels/day | [percent] |
| Delaware | 2000 | 40 gallons | 40 → 72 | [80%] |

Thus there has been shown and described novel means for anionic anti-sludging and nonemulsifying or demulsifying compositions and uses. The present invention fulfills the purposes set forth above. It will be apparent to those skilled in the art, however, that many changes, modifications, variations and other uses and applications for the subject invention are possible. All such changes, modifications, variations and other uses and applications which do not depart from the spirit and scope of the invention are deemed to be covered by the invention, which is limited only by the claims which follow.

What is claimed is:

1. An anti-sludge composition comprising:
an alkyl aryl sulfonic acid or salt thereof,
a nonethoxylated glycol, and
an acetylenic alcohol,
in an alkyl alcohol solvent.

2. The composition of claim 1 wherein said composition contains essentially no ethoxylated glycol.

3. The composition of claim 1 wherein said antisludging composition is anionic.

4. The composition of claim 1 wherein said nonethoxylated glycol comprises water soluble compounds of a general formula of:

$R[OC_nH_{2n}]_xOR$ where n has a value of 3 to 8, x has a value of 1 to 100, and R is hydrogen, methyl or ethyl.

5. An anionic anti-sludge composition for use in the acidizing stimulation of hydrocarbon wells, where the acidizing fluid contains significant concentrations of iron, said composition comprising:
an anionic composition including:
an anionic alkyl aryl sulfonic acid or salt thereof,
an acetylenic alcohol,
a solvating agent comprising a nonethoxylated glycol, and
an alkyl alcohol.

6. The anionic anti-sludge composition of claim 5 wherein the anionic alkyl aryl sulfonic acid or salt thereof, has an alkyl group in the range from 8 to 18 carbon atoms.

7. The anionic anti-sludge composition of claim 6 wherein the anionic alkyl aryl sulfonic acid or salt thereof, having an alkyl group in the range from 8 to 18 carbon atoms, is in the range of about 30 to 50 percent by volume.

8. The anionic anti-sludge composition of claim 6 wherein the anionic alkyl aryl sulfonic acid or salt thereof, having an alkyl group in the range from 8 to 18 carbon atoms, is in the range of about 35 to 45 percent by volume.

9. The anionic anti-sludge composition of claim 6 wherein the anionic alkyl aryl sulfonic acid or salt thereof, having an alkyl group in the range from 8 to 18 carbon atoms, is dodecyl benzenesulfonic acid.

10. The anionic anti-sludge composition of claim 5 wherein the acetylenic alcohol is in the range of about 5 to about 20 percent by volume.

11. The anionic anti-sludge composition of claim 5 wherein the acetylenic alcohol is in the range of about 7.5 to about 12.5 percent by volume.

12. The anionic anti-sludge composition of claim 5 wherein the acetylenic alcohol is propargyl alcohol.

13. The anionic anti-sludge composition of claim 5 wherein the solvating agent is in the range of about 30 to about 50 percent by volume.

14. The anionic anti-sludge composition of claim 5 wherein the solvating agent is in the range of about 35 to about 40 percent by volume.

15. The anionic anti-sludge composition of claim 5 wherein the solvating agent is propylene glycol.

16. The anionic anti-sludge composition of claim 5 wherein the solvating agent is dipropylene glycol.

17. The anionic anti-sludge composition of claim 5 wherein the alkyl alcohol is in the range of about 5 to about 25 percent by volume.

18. The anionic anti-sludge composition of claim 5 wherein the alkyl alcohol is in the range of about 10 to about 20 percent by volume.

19. The anionic anti-sludge composition of claim 5 wherein the alkyl alcohol is methanol.

20. The composition of claim 5 wherein said nonethoxylated glycol comprises water soluble compounds of a general formula of:

$R[OC_nH_{2n}]_xOR$ where n has a value of 3 to 8, x has a value of 1 to 100, and R is hydrogen, methyl or ethyl.

21. An anionic oil well treatment composition for treating subterranean formations containing crude hydrocarbons, said composition comprising:
an aqueous solution containing an effective amount of an acid useful for acidizing oil wells, and
an effective amount of an anionic anti-sludge composition comprising an anionic alkyl aryl sulfonic acid or salt thereof, having an alkyl group in the range from 8 to 18 carbon atoms, and an acetylenic alcohol, dissolved in a solvent mixture of nonethoxylated glycol and alkyl alcohol.

22. The oil well treatment composition of claim 21 wherein the aqueous solution contains about 10 to 28 percent by weight of an acid useful for acidizing oil wells.

23. The oil well treatment composition of claim 21 wherein the composition includes an aqueous acid solution in the range of about 94 to about 99.5 percent by volume.

24. The composition of claim 21 wherein said anti-sludge composition contains essentially no ethoxylated glycol.

25. An oil well treatment composition comprising:
an aqueous solution containing an acid useful for acidizing oil wells, and
an effective amount of an anti-sludge composition comprising:
anionic alkyl aryl sulfonic acid or salt thereof, having an alkyl group in the range from 8 to 18 carbon atoms, in the range of about 30 to about 50 percent by volume,
acetylenic alcohol in the range of about 5 to about 20 percent by volume,
solvating agent comprising glycol containing essentially no ethoxylated glycol in the range of about 30 to about 50 percent by volume, and
alkyl alcohol co-solvent in the range of about 5 to about 25 percent by volume.

26. An oil well treatment composition comprising:
an aqueous solution containing an acid useful for acidizing oil wells, and
an effective amount of an anionic anti-sludge composition comprising:
dodecylbenzenesulfonic acid or salt thereof in the range of about 35 to about 45 percent by volume,
propargyl alcohol in the range of about 7.5 to about 12.5 percent by volume,
a solvating agent comprising a nonethoxylated glycol in the range of about 35 to about 40 percent by volume, and
methanol in the range of about 10 to about 20 percent by volume.

27. A non-emulsifying anti-sludge composition for the acidizing treatment of crude hydrocarbons with acid solutions containing concentrations of ferric or ferrous ions, said non-emulsifying composition comprising:

an anionic composition including:
- an anionic alkyl aryl sulfonic acid or salt thereof,
- an acetylenic alcohol,
- a solvating agent comprising a non-ethoxylated glycol, and
- a lower alkyl monohydric alcohol.

28. An anionic anti-sludge composition for acid stimulation of hydrocarbon wells, where the wells contain amounts of iron over about 2,000 ppm, said composition comprising:

an anionic composition including:
- anionic dodecylbenzenesulfonic acid or salt thereof, in the amount of about 30 percent by volume,
- propargyl alcohol in the amount of about 10 percent by volume,
- a solvating agent comprising a nonethoxylated glycol, in the amount of about 37 percent by volume, and
- methanol in the amount of about 14 percent by volume.

* * * * *